ދ,074,986
Patented Jan. 22, 1963

3,074,986
PROCESS FOR THE PRODUCTION OF ALUMINIUM TRIALKYLS FROM DIALKYL ALUMINIUM HALIDES
Roland Köster, Wolf Rainer Kroll, and Karl Ziegler, Mulheim (Ruhr), Germany; said Köster and said Kroll assignors to said Ziegler, Mulheim (Ruhr), Germany
No Drawing. Filed Mar. 8, 1960, Ser. No. 13,449
Claims priority, application Germany Mar. 14, 1959
9 Claims. (Cl. 260—448)

This invention relates to a process for the production of aluminum trialkyls from dialykyl aluminum halides.

A number of commercially important reactions of the aluminum trialkyls are known, in which aluminum trialkyls are converted into dialkyl aluminum monohalides. For example, in the production of zinc alkyls from aluminum alkyls, only a single alkyl is transferred from aluminum to zinc in accordance with the following equation:

$$ZnCl_2 + 2AlR_3 = ZnR_2 + 2R_2AlCl$$

It is by no means possible to transfer a greater number of alkyls from the aluminum to the zinc. Zinc chloride is of no effect on dialkyl aluminum chloride. A reaction of a similar type is involved in the production of aluminum hydride or solid products having a high content of aluminum hydride from aluminum chloride and diethyl aluminum hydride by the process of the German Patent No. 1,024,062, in which diethyl aluminum chloride is formed as a by-product according to the following equation:

$$AlCl_3 + 3(C_2H_5)_2AlH = AlH_3 + 3(C_2H_5)_2AlCl$$

Reactions of this type can only be applied economically with particular advantage when outlets for the resulting dialkyl aluminum halide are available. If the latter cannot be marketed to the same extent as the main products of the process such as zinc dialkyl or aluminum hydride, these processes are of little advantage.

In this connection and also in several other connections, one is faced with the problem of reconverting dialkyl aluminum halides in a simple manner into aluminum trialkyls. This is also important in the second case mentioned above because aluminum trialkyl can be easily reconverted into dialkyl aluminum hydride by means of hydrogen and aluminum while this is impossible with the dialkyl aluminum halides.

This regeneration of aluminum trialkyls from dialkyl aluminum monohalides is practicable in a known process by treating dialkyl aluminum monohalides with molten sodium in the presence of heat. The following overall reaction takes place in this process:

$$3R_2Al\ halogen + 3Na = Al + 3Na\ halogen + 2AlR_3$$

This regeneration is not very convenient. It also is accompanied by a consumption of metallic sodium and, moreover, the aluminum is obtained in form of a powder which is mixed with sodium halide and of little use. However, the alkyl groups bonded to the aluminum in the alkyl aluminum halide are completely recovered in the form of aluminum trialkyl unless decompositions take place concomitantly.

The invention relates to a new process of converting dialkyl aluminum halides into aluminum trialkyls, in which, to be true, not all but only three quarters of the alkyl groups bonded to aluminum are again available as aluminum trialkyls after the reaction, but which, on the other hand, requires no metallic sodium at all but instead a potassium halide as an auxiliary material. Secondary products obtained in this process are potassium halide complex compounds of monoalkyl aluminum dihalides.

In accordance with the invention, the process of producing aluminum trialkyls from dialkyl aluminum halides comprises converting dialkyl aluminum halides in known manner into complex compounds by heating with potassium halide, splitting the complex compounds by heating to higher temperatures under vacuum in such a manner that a residue consisting of potassium halide and the potassium halide complex compounds of monoalkyl aluminum dihalide, and a distillate consisting of a mixture of aluminum trialkyl and dialkyl aluminum halide are obtained; adding potassium halide to said mixture, and separating, e.g. by distillation, the upper layer consisting of aluminum trialkyl from the reaction product which separates into layers, while the lower layer consisting of the potassium halide complex compound of dialkyl aluminum halide is subjected to another cleavage.

The invention is illustrated hereafter taking the ethyl compound as a convenient example.

Heating of diethyl aluminum chloride with one mol potassium chloride to 100–120° C. results in the formation of a liquid melt of the complex compound $$K[Al(C_2H_5)_2Cl_2]$$

When heating this complex compound under vacuum to 180–200° C., a mixture comprising 60% of aluminum triethyl and about 40% of diethyl aluminum monochloride distils off. When treating this mixture again in the presence of heat with one molecule of potassium chloride based on the quantity of monochloride, it separates into two layers of which the upper is pure aluminum triethyl. The latter may be withdrawn in liquid state or distilled off at about 100° C. under vacuum. The residue may be used for a further cleavage without further treatment.

The potassium halide complex compounds of the dialkyl aluminum halides are known products. The applicant also suggested to split these complex compounds by heating under vacuum, assuming that this would invert the formation of the complex compounds, i.e. potassium halide and dialkyl aluminum halide would be re-formed (German Patent 961,537, lines 81–100 of page 3). If this assumption would have proved true, it would have been impossible to utilize the formation and cleavage of the complex compounds for the production of aluminum trialkyls. It appeared, however, that the following two processes concomitantly proceed when distilling potassium aluminum diethyl dichloride in vacuo:

(1) $\quad K[Al(C_2H_5)_2Cl_2] = KCl + (C_2H_5)_2AlCl$ (2) $\quad 2K[Al(C_2H_5)_2Cl_2] = KCl$
$\qquad\qquad\qquad + K[Al(C_2H_5)Cl_3] + Al(C_2H_5)_3$ The complex compound $K[Al(C_2H_5)Cl_3]$ can be easily obtained from the cleavage residue by extraction with suitable solvents such as aromatic and, if desired, halogenated hydrocarbons such as benzene, toluene, xylene or chlorobenzene. The complex compound in turn may be used for various purposes and, alternatively, may be reacted with an aluminum halide to form free monoalkyl aluminum halides in accordance with the following equation:

$$K[Al(C_2H_5)Cl_3] + AlCl_3 = KAlCl_4 + C_2H_5AlCl_2$$

Since these monoalkyl aluminum dihalides also have gained importance, e.g. as modified Friedel-Crafts catalysts, the process of the invention supplements other, already known reactions in the field of organic aluminum compounds thereby providing a wider range of possible variations and permitting a more versatile use of aluminum-organic compounds as an auxiliary agent for the synthesis than was possible so far.

The terms "halogen" and "halogen compound" used throughout this specification are understood to be chlorine and bromine. In case of the dialkyl aluminum fluorides, the decomposition of alkali fluoride complex compounds proceeds in a different manner. Dialkyl aluminium iodides, on the other hand, do not form complex compounds with potassium iodide and, moreover, may be disproportioned directly to form aluminum trialkyls and aluminum iodides without the trick described herein so that the process of the invention is of no significance in this case.

The process is applicable to dialkyl aluminum bromides to a limited extent only since, on the one hand, relatively little aluminum trialkyl in addition to much dialkyl aluminum bromide appears in the distillate when cleaving the potassium aluminum dialkyl dibromide and, on the other hand, potassium bromide complex compounds exist only in case of the initial members of the homologous series of dialkyl aluminum bromides. Nevertheless, the possibility of converting at least part of the lower dialkyl aluminum bromides into aluminum trialkyls (in addition to a corresponding portion of the potassium aluminum alkyl trihalide) is of commercial importance because the mixtures thus prepared of dialkyl aluminum monobromides with little aluminum trialkyls are usable without further treatment in the process of Belgian Patent 575,992, while the dialkyl aluminum bromides cannot be used so directly. According to the process of this Belgian patent, halogenous organic compounds such as dialkyl aluminum halides are reacted with olefins in the presence of, for example, aluminum trialkyls.

The process of the invention appeared to be particularly advantageous when applied to those complex compounds which contain bromine in addition to chlorine. These complex compounds may quite generally be written as KAlR$_2$XY wherein X and Y may both be chlorine or may both be bromine. However, X and Y may be different, and it is clear in this case that the following three types of uniform complex compounds of this kind must be obtainable:

K[AlR$_2$Cl$_2$]
K[AlR$_2$ClBr]
K[AlR$_2$Br$_2$]

However, in addition to these uniform types of compounds, there is conceivable a great variety of mixtures which may be characterized by the general formula K[AlR$_2$Cl$_{2-n}$Br$_n$] wherein $n$ may be any number including any fractional number between 0 and 2. The particular advantage of using such mixtures consists in that the decomposition taking place in accordance with the invention when distilling occurs substantially more readily than in case of compounds which contain only chlorine, but, on the other hand, leads to reaction products which contain substantially more aluminum trialkyls than are formed by bromine-containing complexes alone.

*Example 1*

195 grams of potassium aluminum diethyl dichloride are heated at 200° C. under a nitrogen atmosphere in a 500 ml. flask held in an oil bath. Vacuum is then applied to the flask which is provided with a descending condenser and a receiver. A distillation starts at the vapors at about 55° C., finally reaches 68° C. under a high vacuum (0.01 mm. Hg) and is completely terminated after 6 to 8 hours. The distillate contains 11.8% chlorine which corresponds to a composition of 40% diethyl aluminum monochloride and 60% aluminum triethyl. Anhydrous potassium chloride in amount of 19 grams is added to the distillate which is then heated until the potassium chloride has completely disappeared and two non-miscible layers have formed. Then the aluminum triethyl is distilled off at a bath temperature of 100° C. and 1 mm. Hg. The residue from this distillation in amount of 48 grams is preferably added to the next batch to be cleaved when repeating the process.

The residue from the first distillation becomes solid upon cooling. It is extracted with anhydrous and air-free benzene in a Soxhlett extraction apparatus with exclusion of air. Potassium chloride in amount of 46 grams remains in the extraction cartridge while 75 grams of potassium aluminum ethyl trichloride are left in the extraction flask after having driven off the benzene. This is a crystalline mass having a melting point of 118° C. If monoethyl aluminum dichloride is intended to be recovered therefrom, 50 grams of aluminum chloride are added after having driven off the benzene and the mixture is heated while stirring. Two layers are formed again, the upper being the monoethyl aluminum dichlorine desired. It is easily distilled off from the potassium aluminum chloride layer under vacuum (boiling point, 128° C./10 mm. Hg) or separated in liquid state. Melting point, 32° C.

*Example 2*

165 grams of diethyl aluminum monobromide are melted together with 119 grams of potassium bromide with exclusion of air. The melt is heated to 140° C. under vacuum (0.2 mm. Hg) in the manner described in Example 1. At 50–52° C., 100 grams of a liquid which contains 42% of bromine distill within 12 hours. This corresponds to a composition of the distillate of 15% aluminum triethyl and 85% diethyl aluminum monobromide. By careful vacuum distillation in a column packed with glass helices, 16 gms. of aluminum triethyl containing only little bromine and 83 grams of diethyl aluminum monobromide are recovered from this mixture. The boiling points of the two compounds are as follows: Al(C$_2$H$_5$)$_3$, 118–119° C.; Al(C$_2$H$_5$)$_2$Br, 140° C., both at 50 mm. Hg. The diethyl aluminum bromide obtained as a residue in this distillation is preferably returned to the residue from the first distillation and the whole procedure is repeated. In this manner, further amounts of aluminum triethyl can be recovered, and now sufficient potassium aluminum ethyl tribromide in addition to potassium bromide is contained in the distillation residue that an extraction step carried out in accordance with Example 1 can be effected to advantage. Melting point of the potassium aluminum ethyl tribromide, 65° C.

*Example 3*

A stirred mixture of 120.5 grams of diethyl aluminum chloride and 119 grams of potassium bromide, or a stirred mixture of 165 grams of diethyl aluminum bromide and 74.5 grams of potassium chloride is heated at 120° C. in an oil bath until a homogenous melt has formed which is then distilled in vacuo while increasing the oil bath temperature to 140° C. Within 2 hours, 89 grams of distillate containing 11.5% bromine and 18.6% of chlorine are obtained. Herefrom, the following composition of the distillate is calculated: 14% of aluminum triethyl, 62.5% of diethyl aluminum chloride, and 23.5% of diethyl aluminum bromide. The distillate is excellently suited for an experiment to synthetize higher aluminum compounds according to Belgian Patent No. 575,992 while the initial halide does not give this reaction.

*Example 4*

By the procedure described in the preceding examples, 120 grams of diethyl aluminum monochloride, 38 grams of potassium chloride and 60 grams of potassium bromide are fused together at 120° C. and then distilled in vacuo under a pressure of 3 mm. Hg. Within 2 hours, 66 grams of distillate are obtained. The distillate contains 20% of chlorine and 2.8% of bromine. The composition is calculated as follows from these values: 26.2% of aluminum triethyl, 68% of diethyl aluminum monochloride, and 5.8% of diethyl aluminum monobromide. A comparison of the course of the experiment in this example with that of Example 1 indicates that the cleavage was largely facilitated by the presence of bromine. The cleavage proceeds at a substantially higher speed and at a lower temperature as compared with Example 1. The distillate may be processed to form pure aluminum triethyl by the procedure of Example 1. Extraction of the residue from the first distillation results in a semi-solid mixture of the complex salts K[Al(C$_2$H$_5$)Cl$_3$] and K[Al(C$_2$H$_5$)Br$_3$].

*Example 5*

148 grams of dipropyl aluminum monochloride and 74.5 grams of potassium chloride are melted at 120° C. by the procedure described in the preceding examples until a clear melt has formed. This melt is heated at 10$^{-3}$ mm. Hg to 160° C. and subsequently to 200° C. In doing so, 92 grams of distillate are obtained within 8 hours. The distillate contains 9.8% of chlorine, which indicates a composition of 41% aluminum tripropyl and 59% dipropyl aluminum monochloride.

*Example 6*

251 grams of potassium aluminum di-n-butyl dichloride obtained by melting together 74.5 grams of potassium chloride and 198 grams of di-n-butylaluminum monochloride are stirred in a distillation flask provided with a magnetic stirrer and held in an oil bath of 150° C. The distillation flask is provided with a receiver and connected to an oil pump. The distillation apparatus is evacuated. At a vapor temperature of about 86° C./10$^{-3}$ mm. Hg, 89 gms. of a colorless distillate which is condensed in the receiver are obtained within 5 hours. The distillation can be accelerated by increasing the speed of stirring and the oil bath temperature to more than 200° C. The residue solidifies upon cooling. It consists of KCl, K[Al(n-butyl)Cl$_3$] and uncleaved K[Al(n-butyl)$_2$Cl$_2$]. The distillate is very active and contains 9.05% of chlorine corresponding to a composition of 55% aluminum tri-n-butyl and 45% di-n-butyl monochloride. It can be reacted with ethylene to form higher aluminum alkyls (see Belgian Patent No. 575,992).

What we claim is:

1. A process of producing an aluminum trialkyl which comprises heating a di-n-alkyl aluminum halide wherein halide designates a member selected from the group consisting of chlorine and bromine with a potassium halide, wherein halide is as just defined, to thereby form a complex, splitting said complex by heating the same to a higher temperature under vacuum so that there is produced a residue consisting of potassium halide and a potassium halide complex of monoalkyl aluminum halide and a distillate consisting of a mixture of aluminum trialkyl and dialkyl aluminum halide, reacting potassium halide with said latter mixture and recovering from the two-layer reaction product formed the upper layer consisting of aluminum trialkyl, and subjecting the lower layer consisting of a potassium halide complex of dialkyl aluminum halide to another splitting reaction as aforesaid.

2. Process according to claim 1, which comprises recovering said upper aluminum trialkyl layer by distillation.

3. Process according to claim 1, which comprises recovering said potassium halide complex of monoalkyl aluminum dihalide from said residue by extracting said residue with a solvent.

4. Process according to claim 3, wherein said solvent is an aromatic hydrocarbon.

5. Process according to claim 4, wherein said solvent is a member selected from the group consisting of benzene, toluene, xylene, and chlorobenzene.

6. Process according to claim 3, which comprises reacting said potassium halide complex of monoalkyl aluminum dihalide with an aluminum halide in accordance with the following equation:

$$K[Al(alkyl)Cl_3] + AlCl_3 = KAlCl_4 + alkyl\ AlCl_2$$

to thereby form monoalkyl aluminum dihalide.

7. Process according to claim 1, wherein said starting alkyl aluminum halide is a mixture of dialkyl aluminum chloride and dialkyl aluminum bromide.

8. Process according to claim 1 wherein a dialkyl aluminum chloride and potassium bromide are the reactants which are heated in the first step in the process.

9. Process according to claim 1 wherein a dialkyl aluminum bromide and potassium chloride are the reactants which are heated in the first step in the process.

References Cited in the file of this patent

UNITED STATES PATENTS 2,839,556     Ziegler et al.     June 17, 1958

FOREIGN PATENTS 770,707     Great Britain     Mar. 20, 1957